United States Patent Office 2,976,327
Patented Mar. 21, 1961

2,976,327

ALPHA-METHYLHYDROCINNAMIC ALDEHYDE DIMETHYL ACETAL

Julian Dorsky, Rockaway, and William M. Easter, Jr., Hasbrouck Heights, N.J., assignors to The Givaudan Corporation, New York, N.Y., a corporation of New Jersey No Drawing. Filed June 9, 1959, Ser. No. 819,024

1 Claim. (Cl. 260—611)

This invention relates to a novel aromatic material and more especially to α-methylhydrocinnamic aldehyde dimethyl acetal.

The novel acetal of this invention has a fine, rose-type odor, rendering it desirable as a perfume agent in perfumery. This odor is unexpected as the corresponding aldehyde has a strong cinnamic odor and the acetals of this aldehyde with ethyl alcohol, propyl alcohol and ethylene glycol have odors which render them of no practical value in perfumery. Further evidence of the unexpectedness of the fine odor possessed by the acetal of this invention is seen from the fact that the corresponding dimethyl acetals of para-isopropyl α-methylhydrocinnamic aldehyde and of 4-tert. butyl α-methylhydrocinnamic aldehyde are practically odorless and devoid of perfume value.

The novel acetal of this invention was prepared in accordance with the following example.

EXAMPLE I

α-Methylhydrocinnamic aldehyde (200 grams) was added to 400 grams of methyl alcohol at 25° C. in a flask under agitation. The temperature rose to about 35° C. Para-toluene sulfonic acid (2 grams) was then added and the temperature rose to about 45° C. Agitation of the solution was maintained for 2 hours, the temperature of the solution being maintained at 40° C. to 50° C.

The contents of the flask were then cooled to 25° C. and the pH was adjusted to 8 with a few milliliters of aqueous sodium hydroxide, 30% concentration. One gram of soda ash was then added and the methyl alcohol was distilled off until the temperature of the contents reached 100° C. The residue was vacuum distilled over a pellet (0.1 gram) of potassium hydroxide to obtain:

|  | G. | B.P., °C. | $n_D^{20}$ |
|---|---|---|---|
| Cut 1 | 2.5 | 80 | 1.5148. |
| Cut 2 | 23.0 | 81 | 1.4984, 40% aldehyde. |
| Cut 3 | 194.3 | 81–83 | 1.4901–1.4921. |
| Residue | 4.2 | | |

Cut No. 3 was redistilled at 1.0 mm. to yield:

|  | G. | B.P., °C. | $n_D^{20}$ |
|---|---|---|---|
| Cut 1 | 5.0 | 81 | 1.4966 |
| Cut 2 | 175.9 | 81–83 | 1.4895 |
| Residue | 10.5 | | |

Cut 2 was purified α-methylhydrocinnamic aldehyde dimethyl acetal. It contained less than 0.5% aldehyde and possessed a fine, rose-type odor which lasts for several days on a perfumer's smelling blotter. The acetal had the following constants:

B.P. 1.0 mm. Hg=81°–83° C.
$n_D^{20}$=1.4895–1.4908
Sp. Gr. 25°/25° C.=0.9750.

The structural formula of the novel acetal is $$C_6H_5CH_2CH(CH_3)CH(OCH_3)_2$$

and may be represented as follows:

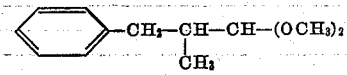

The novel acetal of this invention has been found to be useful, e.g., in rose and other floral compositions such as hyacinth, neroli, and carnation, where it supplied a honey-like sweet understone and thus contributes to the flower realism.

Examples II and III are illustrative examples of desirable perfumes using the novel acetal of this invention as an important ingredient. Example IV shows the unique olfactory character of the novel material of this invention as compared with related compounds, when used in a typical rose perfume. All of the parts given in the examples are by weight.

EXAMPLE II

Hyacinth

| | |
|---|---|
| Heliotropin | 9.2 |
| Musk ambrette | 0.9 |
| Benzyl acetate | 4.6 |
| Cinnamic alcohol | 27.6 |
| Galbanum soluble resin | 0.9 |
| Hydratropic aldehyde 10% in diethyl phthalate | 0.9 |
| Isoeugenol | 0.9 |
| Jasmin | 1.8 |
| Linalool | 9.2 |
| Petitgrain oil S.A. | 8.2 |
| Phenylacetaldehyde | 13.8 |
| Phenylethyl alcohol | 4.6 |
| Rose de Mai | 1.8 |
| Terpineol | 6.4 |
| α-Methylhydrocinnamic aldehyde dimethyl acetal | 9.2 |
| | 100.0 |

All of the above mentioned ingredients, in the amounts indicated, were mixed together under agitation. The resulting perfume was found to have a fragrant, hyacinth odor which renders the perfume useful for scenting toilet waters, bath oils, shampoos, etc.

EXAMPLE III

Carnation

| | |
|---|---|
| Vanillin | 0.8 |
| Anisic aldehyde | 0.4 |
| Benzyl salicylate | 10.4 |
| Cinnamic alcohol | 0.8 |
| Eugenol | 21.1 |
| Heliotropin | 2.1 |
| Ionone alpha | 5.0 |
| Isoeugenol | 5.8 |
| Jasmin | 8.3 |
| Hydroxycitronellol | 2.1 |
| Methyl isoeugenol | 5.8 |
| Phenylethyl alcohol | 10.8 |
| Methylionone | 6.2 |
| Rhodinol | 10.0 |
| Terpineol | 2.1 |
| α-Methylhydrocinnamic aldehyde, dimethyl acetal | 8.3 |
| | 100.0 |

All of the above mentioned ingredients, in the amounts indicated, were mixed together under agitation. The resulting perfume was found to have a pleasing, carnationtype odor which renders the perfume useful for scenting toilet waters, bath oils, shampoos, etc.

EXAMPLE IV

*Rose base*

| | |
|---|---|
| Phenylethyl alcohol | 20 |
| Citronellol | 25 |
| Nerol | 5 |
| Isopropyl myristate | 20 |
| Eugenol | 3 |
| Octyl acetate | 1 |
| Alpha-iso methyl ionone | 3 |
| Linalool | 5 |
| Geranyl acetate | 5 |
| Linalyl acetate | 1 |
| Nonyl aldehyde (10% in diethyl phthalate) | 1 |
| Undecylenic aldehyde (10% in diethyl phthalate) | 1 |
| 2,6-dimethyl octanol | 2 |
| Hydroxy citronellol | 3 |
| Allyl phenoxy acetate | 1 |
| Benzyl acetate | 3 |
| Hexyl cinnamic aldehyde | 1 |
| Oil caraway, 10% in diethyl phthalate | ½ |
| Dimethyl benzyl carbinol | ½ |
| Sol resin labdanum, 10% in diethyl phthalate | 1 |
| | 102 |

All of the above mentioned ingredients, in the amounts indicated, were mixed together under agitation. The resulting base has a rose-like odor but lacks the necessary realism and fragrant properties to be a suitable perfume.

To separate 25 part portions of the foregoing base were added respectively 2 parts of alpha-methylhydrocinnamic aldehyde dimethyl acetal; para-isopropyl-alpha-methylhydrocinnamic aldehyde dimethyl acetal; and para-tertiary-butyl-alpha-methylhydrocinnamic aldehyde dimethyl acetal.

The mixture containing the novel compound of this invention was substantially modified in odor, having gained a deep, honey-rose sweetness which recalls the sweetness of the natural absolute rose de Mai, while the other two mixtures exhibited no noticeable change in odor but retained the unrealism and other deficiencies of the unaugmented rose base.

The foregoing illustrates the practice of this invention which however is not to be limited thereby but is to be construed as broadly as permissible in view of the prior art and limited solely by the appended claim.

We claim:

Alpha-methylhydrocinnamic aldehyde dimethyl acetal.

References Cited in the file of this patent

West et al.: Synthetic Perfumes (1949), p. 111.